July 12, 1949.  R. C. FERGASON  2,476,183
SIDE DELIVERY RAKE

Filed Aug. 28, 1944  3 Sheets-Sheet 1

Inventor
Rector C. Fergason
by K. S. Wyman
Attorney

July 12, 1949.  R. C. FERGASON  2,476,183
SIDE DELIVERY RAKE

Filed Aug. 28, 1944  3 Sheets-Sheet 2

Inventor
Rector C. Fergason
by K. S. Wyman
Attorney

July 12, 1949.　　　R. C. FERGASON　　　2,476,183
SIDE DELIVERY RAKE
Filed Aug. 28, 1944　　　3 Sheets-Sheet 3
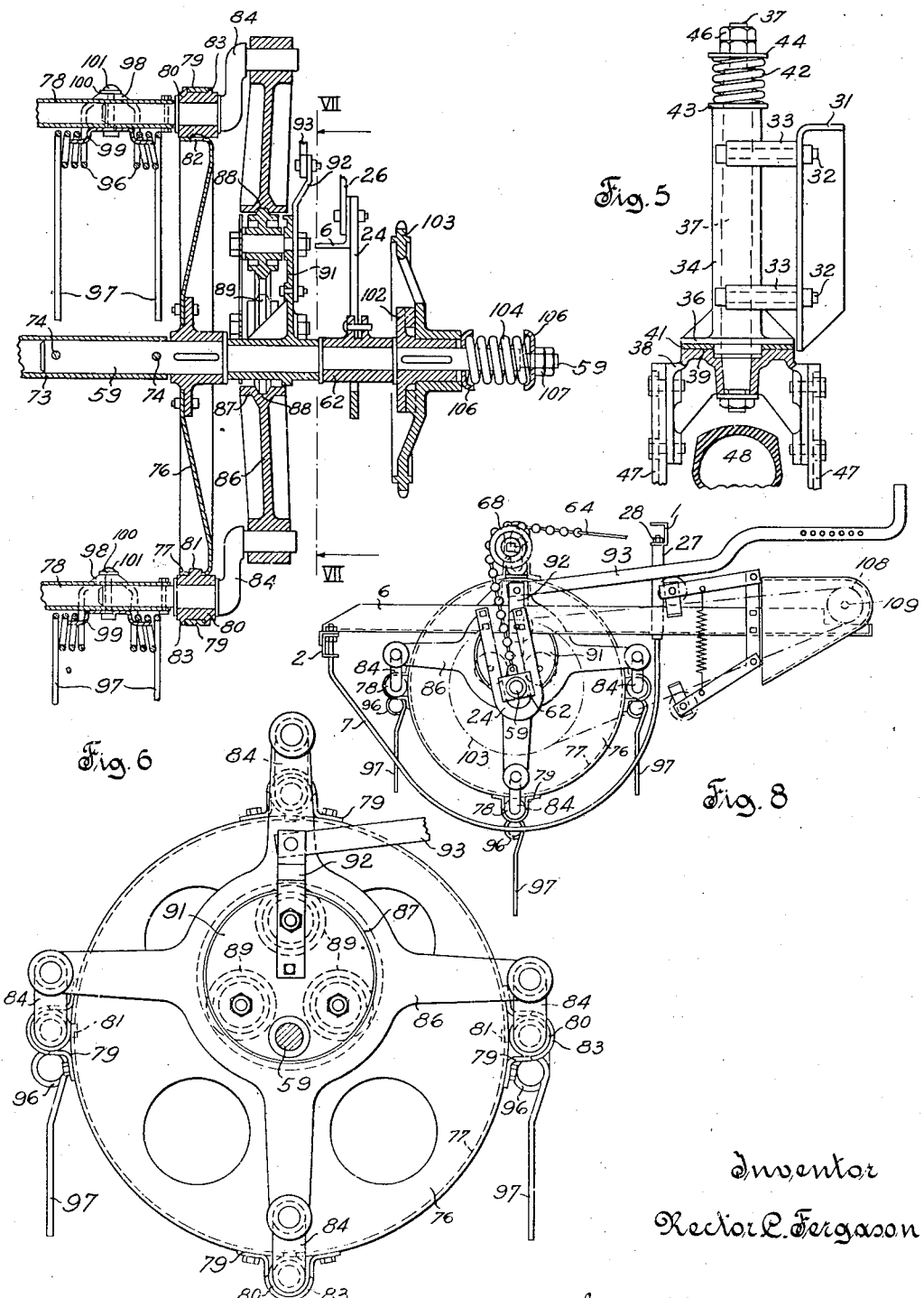

Patented July 12, 1949

2,476,183

UNITED STATES PATENT OFFICE 2,476,183

SIDE DELIVERY RAKE

Rector C. Fergason, La Porte, Ind., assignor to Allis-Chalmers Manufacturing Company, Milwaukee, Wis., a corporation of Delaware Application August 28, 1944, Serial No. 551,469

16 Claims. (Cl. 56—377)

This invention relates to side delivery rakes of the type adapted to be drawn behind a tractor or other suitable draft means and more particularly to the manner of supporting such rakes and the reel spider control assembly carried thereby.

In this connection, the manner of supporting side delivery rakes has heretofore been such that it is extremely difficult even at slow speeds and practically impossible at high speeds to make the rake trail truly behind its draft means when operating on rough and/or sloping terrain and as a result the windrows are crooked and of non-uniform size thereby materially hampering mechanically performed field operations such as loading and baling. In fact, it is practically impossible with rakes supported as heretofore known to even make straight, uniform windrows on smooth terrain when the rake is traveling at speeds of as much or more than five miles per hour. Moreover, prior constructions of this type require a relatively large turning radius thereby materially reducing their maneuverability and effectiveness. Furthermore, the manner of supporting the tine bars and reel-spider control assembly has heretofore also been such that the tine bars and reel-spider control assembly are difficult to assemble, service and replace and that the rotating spider and the rollers supporting same soon become wobbly and difficult to adjust thereby necessitating frequent replacement of at least the supporting rollers in order to maintain the control spider and rollers in correct operative relationship.

It is therefore the primary object of this invention to provide an improved side delivery rake having correlations of features affording a simplified, relatively inexpensive and rugged construction which enables the rake to make extremely short turns and to trail truly behind its draft means during normal raking operations.

Another object of this invention is to provide a rake with an improved tine-bar reel assembly affording a material reduction in the time and effort required to assemble and/or service same.

Still another object of this invention is to provide a rake with improved, severally removable reel bar and spider control assemblies.

A further object of this invention is to provide a rake with an improved reel-spider control assembly mounting effective to maintain associated parts in correct operative relationship and to materially increase durability, smoothness of operation, and ease of adjustment.

The construction and operation of apparatus embodying the invention will become readily apparent as the disclosure progresses and particularly points out additional features and advantages considered of special importance. And accordingly, the invention may be considered as consisting of various details of construction, correlations of elements and arrangements of parts as is more fully set forth in the following description, reference being had to the accompanying drawings, in which:

Fig. 3 is a view of the left end of the rake shown in Fig. 1 with the wheel and yoke structure supporting same omitted;

Fig. 5 is an enlarged detail of the caster wheel mounting;

Fig. 6 is an enlarged longitudinal vertical section of the right hand end of the reel and reel spider control assembly;

Fig. 7 is a view taken on line VII—VII of Fig. 6;

Fig. 8 is a right-side elevation of the structure shown in Fig. 6;

Fig. 9 is an enlarged plan view of the variable speed, reverse gearing with part of the housing broken away to better show the construction; and Fig. 10 is an elevation of the left side of the structure shown in Fig. 9 with the wall removed to better show the arrangement of shafts and gears.

Figure 1:
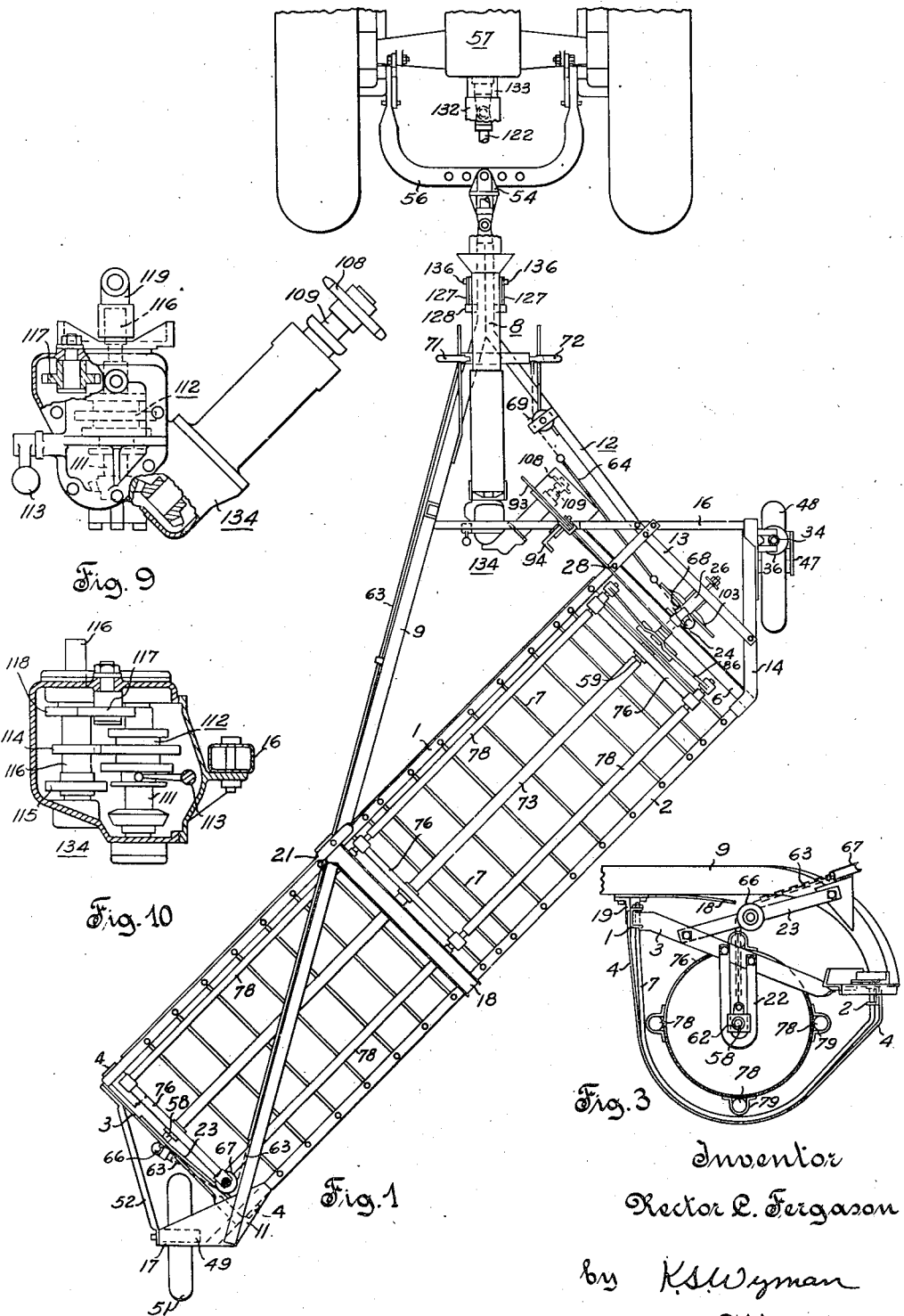
Fig. 1 is a plan view illustrating a tractor drawn rake embodying the invention.
Figure 2:
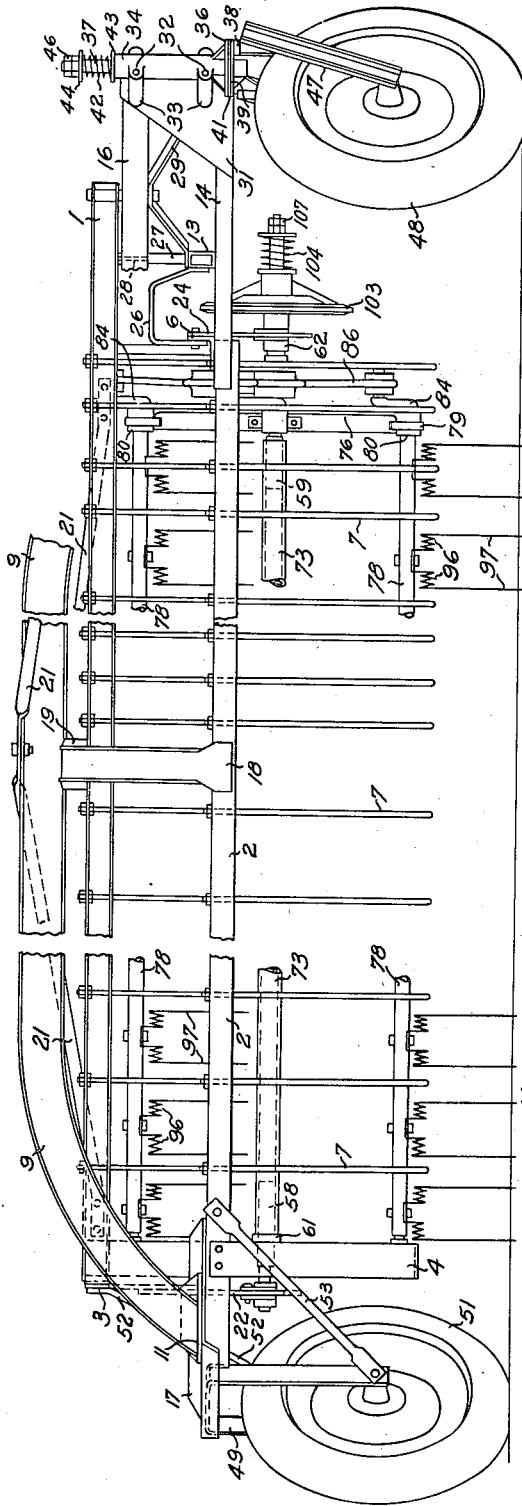
Fig. 2 is an enlarged rear view of the rake shown in Fig. 1 with intermediate portions of the frame structure omitted.

Referring to Figs. 1, 2 and 3 of the drawings, it is seen that a side delivery rake embodying the invention may include a reel-mounting frame structure comprising parallel front and rear channel beams 1 and 2 having their left hand end portions interconnected by a bar 3 and a basket forming band 4, having their right hand end portions connected by an angle member 6, and having longitudinally spaced opposed portions interconnected by reel-basket forming stripper bars 7; a forwardly projecting, rigid draft frame structure terminating in a tongue part 8 and comprising a beam member 9 which extends rearward and upward in arched relation over an intermediate portion of front channel beam 1 in spaced oblique relation thereto and then downward to a point adjacent the left rear corner of the reel frame to which it is rigidly secured by means of a plate member or the like 11 and a beam member 12 which extends rearward and upward from tongue part 8 in diverging relation with respect to beam member 9 and terminates in a horizontal portion 13 (see Fig. 4) which extends substantially parallel to reel frame angle member 6 and is rigidly secured to an intermediate portion of a forwardly projecting extension 14 on the adjacent end of rear channel beam 2 and to an intermediate portion of a cross member 16 which is connected with the forward end of extension 14, with the adjacent end of front channel beam 1, and with the adjacent forward end portion of angle member 6; and an outwardly projecting left wheel supporting bracket 17 which may be an integral part of plate member 11 or a part separable therefrom as indicated in Fig. 2.

The mid portions of front and rear channel beams 1 and 2 are interconnected by an upwardly arched brace 18 having its lower end secured directly to beam 2 and having its upper end secured to the underside of tongue beam 9 which is in turn rigidly connected with the underlying portion of channel 1 by means of a strap or plate 19. In addition, a brace member 21 connects end portions of channel beam 1 with that portion of the upper side of beam member 9 overlying the adjacent end of arched brace 18. The left side of the reel frame includes a U-shaped reel bearing supporting bracket 22 secured in depending relation to the mid portion of bar 3 and a brace member 23 connects an intermediate portion of bar 3 with a portion of beam member 9 spaced from plate 11 and from channel beam 2. The right side of the reel frame also includes a U-shaped reel-bearing supporting bracket 24 secured in depending relation to a portion of angle member 6 intermediate its points of connection with front and rear channel beams 1 and 2. An inverted U-shaped brace member 26 connects the reel bearing supporting portion of angle member 6 with an opposed portion of draft beam 12. In this connection, it should be noted, particular attention being directed to Fig. 2, that cross member 16 is disposed in vertically spaced relation with respect to front channel beam 1, with respect to angle member 6, with respect to rear channel beam extension 14 and with respect to draft beam 12, that the connection between such spaced parts may be effected in any suitable manner such as by means of a spacer tube 27 and a bolt 28 shown in Fig. 2 as interconnecting cross member 16 with the underlying portion of draft beam 12 (see also Fig. 8), that the connected portions of cross member 16, extension 14, front channel beam 1 and draft beam 12 may be further braced by an interconnecting strap member 29, and that the connection between cross member 16 and extension 14 may be additionally braced by a plate member 31.

The interconnected portions of front channel beam 1, draft beam 12, extension 14 and cross member 16 form in effect an outwardly disposed rigid triangular frame structure (see Fig. 1) to the plate member 31 of which is rigidly secured, by means of bolts 32 and spacer tubes 33, a vertical pivot bearing 34 terminating at its lower end in an annular horizontal face plate portion 36. Pivotally mounted in bearing 34 is a shaft portion 37 of a wheel yoke 38 having an upper annular complementary face plate portion 39 adapted to engage bearing face plate 36 or a clutch facing 41 disposed therebetween; the face plates being retained at all times in firm frictional engagement with opposite sides of clutch facing 41 by means of a spring 42 surrounding the upper exposed end of shaft portion 37 with its lower end engaging the upper end surface of bearing 34 or a washer 43 abutting same and with its upper end engaging a washer or seat 44 retained on the upper end of shaft portion 37 in any suitable manner such as by nuts 46. Secured to opposite sides of yoke 38 are a pair of depending rigid arms 47 between the lower opposed end portions of which is removably mounted a suitable supporting wheel 48 rotatable about a fixed horizontal axis. In this connection, it should be particularly noted that the mounting of this wheel is such that its swiveling action, that is a turning of shaft portion 37 in bearing 34, is resisted with uniform force by the face plate, clutch facing engaging action of spring 42, for any and all positions of the wheel, and that, although the force with which the face plate portions 36, 39 engage clutch facing 41 will increase and decrease as the load supported by wheel 48 increases and decreases, respectively, wheel 48 will not swivel or caster even when free of the ground.

The outwardly disposed left wheel mounting frame portion, which appears as a triangular structure in Fig. 1, comprises a rigid yoke 49 fixedly secured in depending relation to the outer underside portion of bracket 17, a suitable supporting wheel 51 mounted between opposed lower portions of yoke 49 for rotation about a horizontal axis, and a brace member 52 connecting the outer wheel mounting portion of yoke 49 with the adjacent end of front channel beam 1. Yoke 49 is additionally braced by a member 53 connecting the inner wheel mounting portion of the yoke with rear channel beam 2 as best shown in Fig. 2. This wheel is mounted in approximate parallel relation with respect to tongue part 8 of the draft frame, that is with its spindle or horizontal axis of rotation fixedly disposed approximately at right angles to the normal direction of rake movement. Tongue part 8 includes a clevis or other suitable hitch part 54 adapted to supportingly attach the forward end of the rake structure to a drawbar or the like 56 mounted for vertical adjustment on a tractor or other suitable draft means 57. The particular manner in which the drawbar is supported on the draft means is immaterial and a further description in this connection is deemed unnecessary for a complete understanding of the present invention. However, it should now be obvious that the frame structure thus far described includes a tongue part 8 affording a single point support for mounting the forward end of the structure on a draft means, a non-swiveling ground engaging wheel 51 supporting the left rear end of the structure, and a ground engaging caster wheel 48 supporting the right end of the structure, and that swiveling action of the caster wheel is resisted at all times by the face plate, clutch facing engaging action of spring 42.

Figure 4:
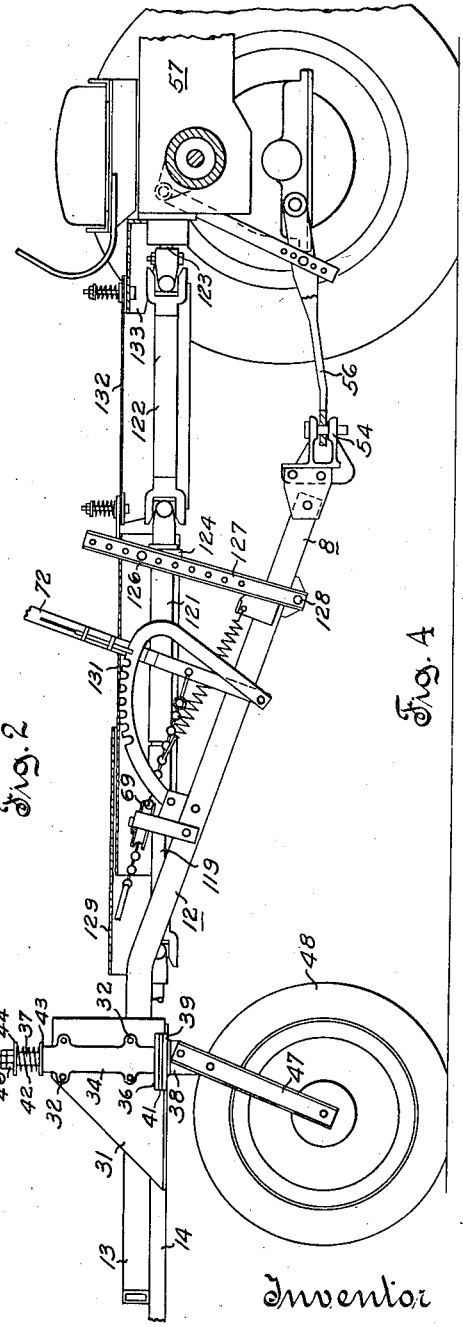
Fig. 4 is a right-side elevation of the draft frame structure shown in Fig. 1 with parts omitted in the interest of simplicity.

A pair of opposed reel stub shafts 58, 59 are rotatably mounted in bearings 61, 62 including rectangular housing structures having grooved opposite sides guidingly engaged with U-shaped brackets 22 and 24, respectively, for adjustment vertically thereof as best indicated in Fig. 8; the bearings 61, 62 being severally, adjustably suspended by means of chains, cables or the like 63 and 64 which pass over suitable frame mounted pulleys or equivalent guiding elements 66, 67 and 68, 69, respectively, and connect with independently operable adjusting devices such as levers 71 and 72 operatively mounted on the forward end of the draft frame as is best shown in Figs. 1 and 4. The opposed ends of stub shafts 58, 59 are united and in effect made continuous by an interconnecting tube shaft 73 fixedly secured in telescoping relation to the opposed ends of the stub shafts in any suitable manner as by cap screws 74. The portion of stub shaft 58 adjacent bearing 61, the mid portion of tube shaft 73, and the portion of stub shaft 59 adjacent bearing 62 each have keyed or otherwise secured thereto a similar fabricated reel bar disk 76 having a laterally projecting peripheral flange 77 coaxial with respect to shaft portions 58, 59 and 73. A plurality of similar reel tooth or tine carrying bars 78 are detachably secured to the outer peripheral surface of the flanges 77 on reel disks 76 in circumferentially spaced relation with respect to each other by means of strap elements 79 and by means of similar end and mid portion bearing structures 80 each including a housing having a base portion complementary to the outer peripheral surface of flange 77 and provided with a depending positioning boss 81 disposed in an aperture 82 therein and having a coaxial upper portion provided with circumferentially extending spaced ribs or flanges 83 forming a groove in which is disposed a strap element 79; the strap elements each including oppositely extending feet portions which are bolted or otherwise removably secured to the outer peripheral surface of reel disk flange 77 on either side of a bearing structure 80 as is best shown in Fig. 7.

The right hand end of each reel bar 78 is provided with a crank extension 84 rotatably journaled in opposed peripheral portions of a control spider 86 having an annular hub part 87 provided with a circumferentially grooved inner surface 88 coaxial with respect to the journaled ends of crank extensions 84. Spider 86 is rotatably supported on a coaxial group of ribbed rollers 89 detachably mounted on a member 91 which is in turn eccentrically mounted on stub shaft 59, preferably between bearing 62 and reel bar disk 76, to turn relative thereto; the ribbed surfaces of rollers 89 being complementary to and supportingly engaging the inner grooved surface 88 on spider hub part 87 thereby retaining the spider, rollers and the roller carrying member in correct operative relationship. In this connection, it should be noted that the depth of the groove in surface 88 is greater than the height of the ribs on rollers 89. Member 91 may be turned to and retained in any selected one of a plurality of positions by means of an arm 92 thereon having its remote end pivotally connected with a forwardly extending control rod 93 which may be retained in the position selected by means of a draft frame supported, releasable latch element 94 (see Fig. 1). Movement of member 91 varies the position of spider 86 with respect to reel bar disk 76 and thereby the angular position of tine bars 78 and the tines mounted thereon; the tine bars responding to a movement of member 91 and spider 86 by turning in their bearing structures 80 detachably secured to reel bar disks 76.

As herein shown, the rake teeth are formed by a plurality of spring-tine elements each having a pair of spaced opposed coil portions 96, a tooth portion 97 extending from each coil portion and a loop portion 98 uniting the coil portions 96; the spring-tine elements being detachably secured to the bars 78 by means of a part 99 having end portions disposed within the coils 96 and an offset intermediate portion engaging the underside of bar 78 and provided with an aperture therein alined with opposed holes in the bar, and a part 101, such as a bolt or the like, passing through loop portion 98, through the alined holes and aperture in bar 78 and part 99. The head end of part 101 may, if desired, be provided with a loop engaging clip portion or washer element 100. The end portions of part 99 are secured in spaced parallel relation to the underside of bar 78 and are preferably shaped as is also the offset intermediate portion to conform with the interior surface of the coils and with the underside of bar 78, respectively.

The outer end of stub shaft 59 is provided with a reel drive clutch comprising an element 102 secured to shaft 59 and a sprocket wheel element 103 rotatable relative to element 102 and releasably engaged therewith by means of a spring 104 surrounding shaft 59 and retained thereon in operative engagement with sprocket wheel element 103 by means spring seats 106 and nuts 107; the arrangement of these parts being such that elements 102, 103 are normally engaged to drive shaft 59 but are automatically disengageable to prevent damage whenever the driven load becomes excessive. Sprocket wheel 103 is chain driven from a driving sprocket 108 carried by a shaft 109 which is in turn geared to a shaft 111 mounting slidable gears 112 selectively meshable, by actuation of a shifting lever or the like 113, with gears 114, 115 fixed on a shaft 116 and with a reverse idler 117 in continuous mesh with a gear 118 also fixed to shaft 116; the latter being universally coupled with the adjacent end of a power shaft including telescoping sections 119, 121 and a universally connected end section 122 adapted to be detachably drivingly connected with a tractor power take-off shaft or the like 123. The forward end of telescoping section 121 is supported in a bearing structure 124 which is in turn journaled to pivot about a horizontal axis on a pin or the like 126 mounted for vertical adjustment on a pair of standards 127 supported for horizontal angular movement on a pivot mounting 128 carried by tongue part 8. Power shaft sections 119, 121 and 122 are preferably at least partially enclosed in a shield structure comprising telescoping sections 129, 131 and an end section 132 removable secured to the forward end of section 131 and to the rear end of a power take-off shaft shield 133 on tractor 57 in order to obtain ready access to the coupling between power shaft section 122 and power take-off shaft 123 and to the universal joints forming a part of shaft section 122. The rear end of shield section 129 is secured to the adjacent end of the gear box 134 enclosing shafts 111, 112 and the forward end of section 131 is journaled on horizontal pivots 136 carried by standards 127; shaft 109 and gear box 134 being preferably detachably mounted on angle member 6 and cross member 16 or other parts of the frame structure in any suitable manner, such for example, as is indicated in Figs. 1 and 10.

The selective shifting of sliding gears 112 provides two raking speeds of reel rotation and a single reverse tedding speed sufficiently high for all practical speeds of rake travel. The low raking speed of reel rotation is suitable for rake travel speeds of as much as five miles per hour depending upon the quantity and nature of the material being raked, while the higher raking speed of reel rotation is suitable for higher speeds of rake travel. In this connection, the selective shifting of gears 112 can be readily accomplished by stopping power take-off shaft 123 and actuating lever 113; the stopping and starting of shaft 123 being readily controlled by the usual tractor mounted device or devices (not shown). In addition, the levers for severally adjusting stub shaft bearings 61, 62 and the rod for adjusting reel spider control member 91 may be positioned and arranged as shown or in any other manner facilitating operation of same.

It should now be obvious that tine bars 78 may be severally attached to and removed from reel bar disks 76 simply by removing the retaining strap elements 79 and withdrawing the journal portions of crank extensions 84 from spider 86 thereby materially reducing assembling and servicing costs and that such costs are further reduced by the use of severally removable spring tine element as herein disclosed. In this connection, the bearing structures and spring tine elements are first assembled on the bars, the journal portions of the bar crank extensions are then inserted in the spider 86 if it is already mounted on stub shaft 59, and the bearing structures clamped to flange 77 of reel disk 76 by bolting the strap elements 79 thereto as previously indicated. If desired, spider 86 may be positioned on the journal portions of crank extensions 84 after bars 78 have been secured to reel disks 76. Consequently, the reel bars and tines and the reel control spider may be severally assembled and removed as desired with a minimum of time and effort.

In general, the construction herein shown and described embodies correlations of features for severally and/or collectively accomplishing in whole or in part any one or more of the aforementioned objects and advantages and it should be understood that although the invention is particularly applicable to side delivery rakes of the type adapted to be supportingly connected to and drawn behind a vehicle or other form of traveling support or draft means, certain features and correlations thereof are of more general application and may be applied to other and different types of rakes including those adapted to be supportingly connected with and pushed ahead of the vehicle or traveling support, and that therefore it is not desired to limit the invention to the exact details of construction, correlations of elements, and arrangements of parts herein disclosed for purposes of illustration as various modifications within the scope of the appended claims may occur to persons skilled in the art.

It is claimed and desired to secure by Letters Patent:

1. A traveling rake structure comprising a generally rigid frame having a hitch part for connecting said frame in trailing relation to a propelling vehicle, a fixed direction wheel mounted in ground engaging supporting relation to a portion of said frame rearwardly remote from said hitch part, said wheel being positioned for rotation about an axis transverse to the direction of travel, at least one castering wheel mounted in supporting relation to a portion of said frame intermediate said hitch part and said fixed direction wheel and being disposed in laterally offset relation to a straight line passing through said hitch part and said fixed direction wheel, and means on said frame and adjacent said fixed direction wheel and said at least one castering wheel for mounting an elongated raking device on said frame.

2. A structure as defined in claim 1 wherein said hitch part is disposed in fixed relation to said rigid frame.

3. A structure as defined in claim 1 including means adjustable to control swiveling action of said at least one castering wheel.

4. A structure as defined in claim 1 including an elongated raking device supported on said mounting means and thereby positioned to extend in oblique relation to said axis.

5. A structure as defined in claim 1 including a side delivery raking device carried by said mounting means with the discharge end of said raking device disposed adjacent said fixed direction wheel.

6. A structure as defined in claim 1 including a side delivery raking device carried by said mounting means with the discharge end of said raking device disposed adjacent said fixed direction wheel and including means adjustable to control swiveling action of the castering wheel disposed adjacent the other end of said raking device.

7. A structure as defined in claim 1 wherein said frame includes a pair of rigid members fixed thereto adjacent each of said wheels and extending forwardly therefrom in converging relation toward said hitch part.

8. A structure as defined in claim 1 including an elongated rotatable raking device supported on said mounting means and thereby positioned with its axis of rotation disposed in oblique relation to said transverse axis, said raking device having its discharge end disposed adjacent said fixed direction wheel.

9. A structure as defined in claim 1 wherein said frame includes a pair of rigid members fixed thereto adjacent each of said wheels and extending forwardly therefrom in converging relation toward said hitch part, and wherein an elongated rotatable raking device is supported on said mounting means and thereby positioned with its axis of rotation disposed in oblique relation to said transverse axis.

10. A structure as defined in claim 1 wherein said frame includes a pair of rigid members fixed thereto adjacent each of said wheels and extending forwardly therefrom in converging relation toward said hitch part, wherein an elongated rotatable raking device is supported on said mounting means and thereby positioned with its axis of rotation disposed in oblique relation to said transverse axis and wherein said raking device has its discharge end disposed in advance of said fixed direction wheel.

11. A traveling rake structure comprising a generally rigid frame having a hitch part for connecting said frame in trailing relation to a propelling vehicle, a fixed direction wheel mounted in ground engaging supporting relation to a portion of said frame rearwardly remote from said hitch part, said wheel being positioned for rotation about an axis transverse to the direction of travel, at least one castering wheel mounted in supporting relation to a portion of said frame intermediate said hitch part and said fixed direction wheel and being disposed in laterally offset relation to a straight line passing through said hitch part and said fixed direction wheel, and an elongated side delivery raking device mounted on said frame and thereby positioned in oblique relation to said transverse axis with the discharge end of said device disposed adjacent said axis.

12. A structure as defined in claim 11 including means adjustable to control swiveling action of the castering wheel disposed adjacent the other end of said device.

13. A structure as defined in claim 11 wherein said frame includes a pair of rigid members fixed thereto adjacent opposite ends of said raking device and extending forwardly therefrom in converging relation toward said hitch part.

14. A structure as defined in claim 13 wherein at least one of said rigid members arches upward and over said raking device and extending forwardly toward said hitch part.

15. A structure as defined in claim 11 wherein the discharge end of said raking device is disposed in advance of said fixed direction wheel.

16. A structure as defined in claim 15 wherein said frame includes a pair of rigid members fixed thereto adjacent opposite ends of said raking device and extending forwardly therefrom in converging relation toward said hitch part, and wherein one of said pair of rigid members arches upward and over said raking device from a point immediately adjacent said fixed direction wheel.

RECTOR C. FERGASON.

REFERENCES CITED

The following references are of record in the file of this patent:

UNITED STATES PATENTS

| Number | Name | Date |
| --- | --- | --- |
| 1,159,444 | Waterman | Nov. 9, 1915 |
| 1,658,996 | Mowry | Feb. 14, 1928 |
| 1,728,301 | Murphy et al. | Sept. 17, 1929 |
| 1,830,040 | Rutter | Nov. 3, 1931 |
| 2,028,332 | Johnson | Jan. 21, 1936 |
| 2,160,275 | Magee et al. | May 30, 1939 |
| 2,255,283 | Jones et al. | Sept. 9, 1941 |
| 2,296,065 | Slamp | Sept. 15, 1942 |
| 2,334,888 | Strandlund | Nov. 23, 1943 |

FOREIGN PATENTS

| Number | Country | Date |
| --- | --- | --- |
| 715,547 | France | Sept. 28, 1931 |